(12) United States Patent
Quaranta

(10) Patent No.: US 6,425,171 B1
(45) Date of Patent: Jul. 30, 2002

(54) SHROUDED TUBE TERMINATION METHOD

(75) Inventor: Cosimo Quaranta, Santena (IT)

(73) Assignee: 40 Properties Management, Ltd., Cleveland, OH (US)

( * ) Notice: Subject to any disclaimer, the term of this patent is extended or adjusted under 35 U.S.C. 154(b) by 118 days.

(21) Appl. No.: 09/675,071

(22) Filed: Sep. 28, 2000

(51) Int. Cl.$^7$ .............................................. B23P 17/00
(52) U.S. Cl. ....................... 29/414; 29/516; 138/124; 138/143
(58) Field of Search ........................ 29/412, 414, 516; 285/382; 138/121, 124, 139, 142, 143

(56) References Cited

U.S. PATENT DOCUMENTS

| | | |
|---|---|---|
| 2,309,719 A | 2/1943 | Vaill |
| 2,323,912 A | 7/1943 | Johnson |
| 2,583,956 A | 1/1952 | Lindsay et al. |
| 2,848,254 A | 8/1958 | Millar |
| 3,023,496 A | 3/1962 | Millar |
| 3,673,547 A | 6/1972 | Ziegler, Jr. |
| 3,689,112 A * | 9/1972 | Slator et al. |
| 3,740,832 A * | 6/1973 | Toepper |
| 4,257,155 A | 3/1981 | Hunter |
| 4,400,022 A | 8/1983 | Wright |
| 4,437,691 A | 3/1984 | Laney |
| 4,542,922 A | 9/1985 | Grossauer |
| 4,630,850 A | 12/1986 | Saka |
| 4,671,542 A | 6/1987 | Juchnowski |
| 5,080,405 A | 1/1992 | Sasa et al. |
| 5,131,696 A | 7/1992 | Sykes et al. |
| 5,219,186 A | 6/1993 | Hosseinian et al. |
| 5,404,632 A | 4/1995 | Zaborszki |
| 5,499,439 A | 3/1996 | Zaborszki et al. |
| 5,511,720 A | 4/1996 | Zaborszki et al. |
| 5,803,506 A * | 9/1998 | Argersinger et al. |
| 5,903,980 A * | 5/1999 | Collier et al. |
| 6,003,561 A * | 12/1999 | Brindza et al. |

* cited by examiner

Primary Examiner—David P. Bryant
(74) Attorney, Agent, or Firm—Watts Hoffmann Fisher & Heinke

(57) ABSTRACT

A method of making a wire braid shrouded annularly corrugated metal tube. An annularly corrugated metal tube is formed. A braided wire shroud is placed around the annularly corrugated metal tube. The braided wire shroud is deformed into a corrugation valley of the annularly corrugated metal tube so that the shroud conforms to the adjacent peaks and the intervening valley. The annularly corrugated metal tube and the braided wire shroud are severed at a desired location between the corrugation peaks. The shroud is then bonded to the tube adjacent the end of the shrouded tube.

13 Claims, 3 Drawing Sheets

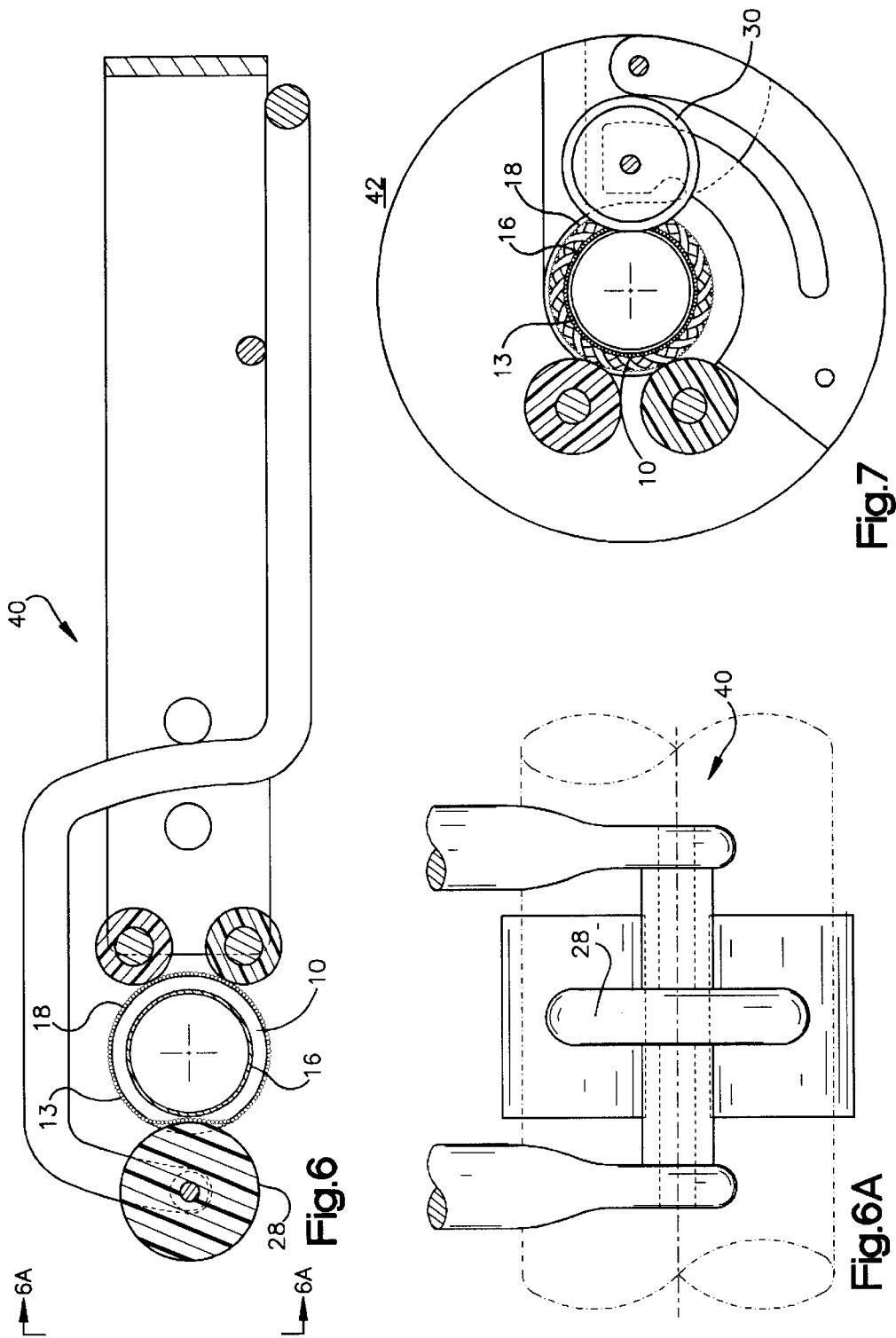

SHROUDED TUBE TERMINATION METHOD

FIELD OF THE INVENTION

The present invention relates to a method of terminating an annularly corrugated metal tube that is covered with a braided wire shroud.

BACKGROUND OF THE INVENTION

Corrugated and convoluted metal tubes are often covered by braided wire shrouds to increase the tube burst strength when used to convey high pressure fluids. Such tubes are frequently welded to end fittings by which they can be detachably coupled to fluid handling equipment. Sometimes the tubes are welded directly to the fluid handling equipment. In either case, the tube termination must be formed by cutting off both the braided shroud and the corrugated metal tube.

Annularly corrugated metal tubes are often preferable to helically convoluted tubes because of improved performance in high pressure applications. Among other things, annularly corrugated tubes can be joined hermetically to fittings more easily than helically corrugated tubes because the tube termination can form a regular circular configuration wherever the tube is cut-off in a plane that is normal to the tube axis. The tubes are usually sawed to form the termination. Most fittings are designed to join the tube to the fitting at the radially inner valley of a corrugation.

When used in pressure applications, annularly corrugated tubes are covered by a braided wire shroud that extends completely along the tube length and is fixed in the fitting, or the like, with the tube end. Because the shrouds are tightly braided, the tube can not be seen as the braid and tube are cut off. Accordingly, the tube is often cut off at a location that is spaced longitudinally from the radially inner valley of a corrugation or any other tube location where the termination is desired. This necessitates grinding the tube end until the tube terminates at the radially inner valley of a corrugation, or otherwise at a desired location. The grinding operation is not only time consuming and labor intensive but also leaves the braided shroud end badly frazzled. Welding the shroud end to the tube is complicated by the frayed shroud end.

The present invention provides a new and improved method of terminating an annularly corrugated metal tube covered by a braided wire shroud wherein the tube is accurately cut-off where desired without the necessity of grinding the tube end and shroud.

DISCLOSURE OF THE INVENTION

The present invention concerns a method of making a wire braid shrouded annularly corrugated metal tube. An annularly corrugated metal tube is formed with corrugations having radially inner corrugation valleys and radially outer corrugation peaks. Adjacent corrugation peaks and valleys are connected by generally radially extending tube wall sections. A braided wire shroud is placed around the corrugated tube with the shroud extending along the radially outer corrugation peaks. A forming tool is moved into engagement with the braided shroud to yieldably deform a portion of braided shroud and move the deformed portion substantially into conformity with a tube corrugation valley so that the valley is located. The shroud also conforms to the corrugation peaks on opposite sides of the located tube corrugation valley during the deformation process. The braided shroud and tube are then severed.

In the illustrated embodiment of the invention the shroud obscures the tube from view. The forming tool is guided by engagement with the shroud and the underlying tube wall into the corrugation valley to locate the valley and the adjacent peaks along the shrouded tube. The illustrated forming tool is rotated relative to the corrugated tube as the forming tool moves radially inwardly so the shroud is deformed into the tube corrugation valley around the tube circumference.

The shrouded tubed is severed by a second tool. In the illustrated and described embodiment of the invention the shroud and tube are severed between the corrugation peaks on opposite sides of the valley by a cutting tool that rotates relative to the shrouded tube.

Additional features of the invention will become apparent and a fuller understanding obtained by reading the following detailed description in connection with the accompanying drawings.

BRIEF DESCRIPTION OF THE DRAWINGS

FIG. 6 is a side elevation view of one embodiment of a forming tool;

FIG. 6A is a fragmentary elevational view seen approximately from the plane indicated by the line 6A—6A of FIG. 6; and FIG. 7 is a side elevation view of one embodiment of a cutting tool.

BEST MODE FOR CARRYING OUT THE INVENTION

Figure 1:
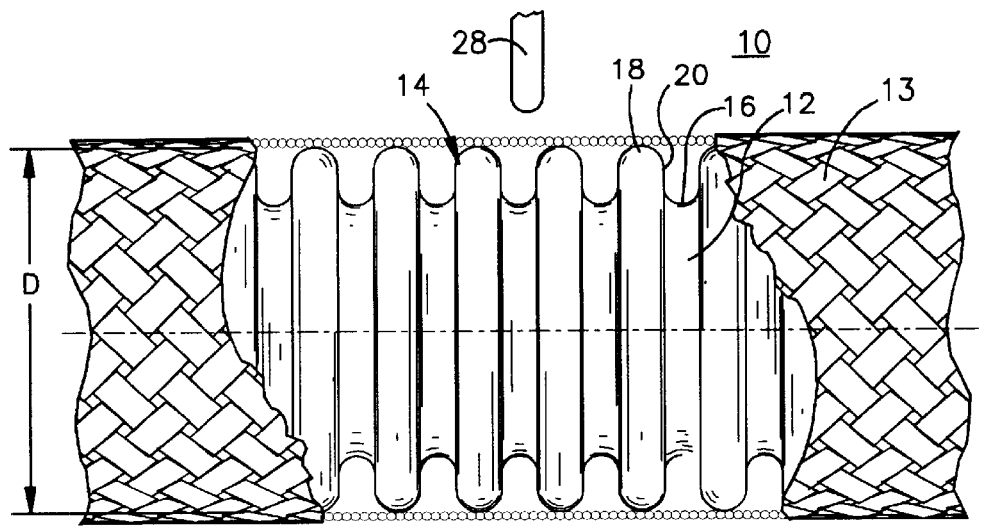
FIG. 1 is a fragmentary elevation view partly in cross-section of a forming tool being brought into engagement with a shrouded corrugated tube.

FIGS. 1–5 of the drawings illustrate a method of terminating a wire braid shrouded tube 10 according to the invention. The shrouded tube 10 comprises an annularly corrugated metal tube 12 and a braided wire shroud 13 surrounding the tube 12. The annularly corrugated metal tube 12 is formed in a manner known in the art. The tube 12 includes corrugations 14 that are formed by radially inner corrugation valleys 16 and radially outer corrugation peaks 18. Each corrugation valley 16 is connected to an adjacent peak 18 by a generally radially extending tube wall section 20.

The braided wire shroud 13 surrounds the corrugated tube 12 with the inner shroud diameter extending along the outer corrugation peaks 18. The illustrated shroud 13 is braided in place on the tube 12 as the tube passes axially through a braiding machine. The illustrated shroud thus hugs the tube 12 with the inner shroud diameter tightly engaging the corrugation peaks 18. Braiding machines for applying shrouds to tubes are well known and are therefore not described. Moreover, shrouds may be placed on the tube in other manners, if desired.

When the shroud 13 is placed on the tube 12, the corrugation peaks and valleys can not be seen from the outside of the shrouded tube 10 because the wires forming the braiding are packed tightly together. The inability to see the tube corrugations complicates the process of cutting the shrouded tube 10 at accurately determined locations along the corrugations.

Figure 2:
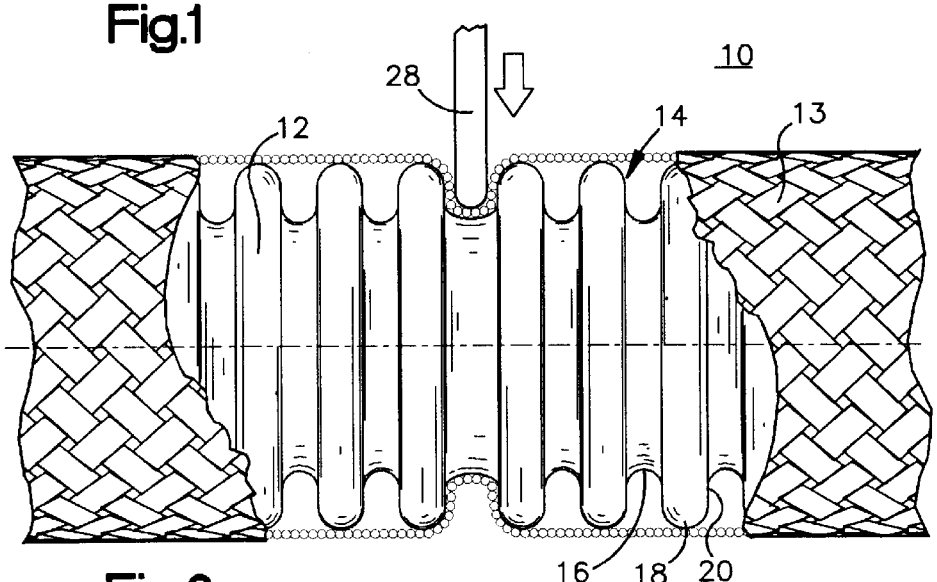
FIG. 2 is a view similar to FIG. 1 showing the forming tool deforming the tube shroud into the valley of a corrugated tube.
Figure 3:
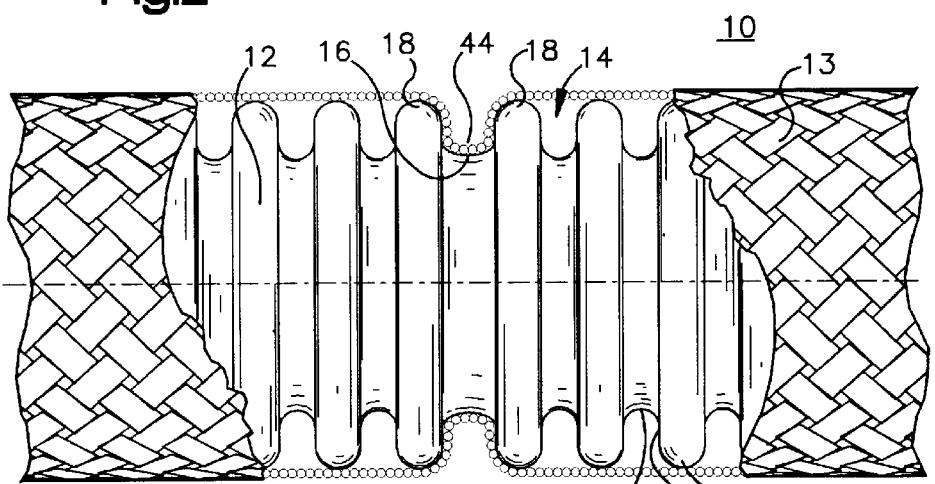
FIG. 3 is a view similar to FIG. 1 showing the shroud yieldably deformed into the corrugation valley.
Figure 4:
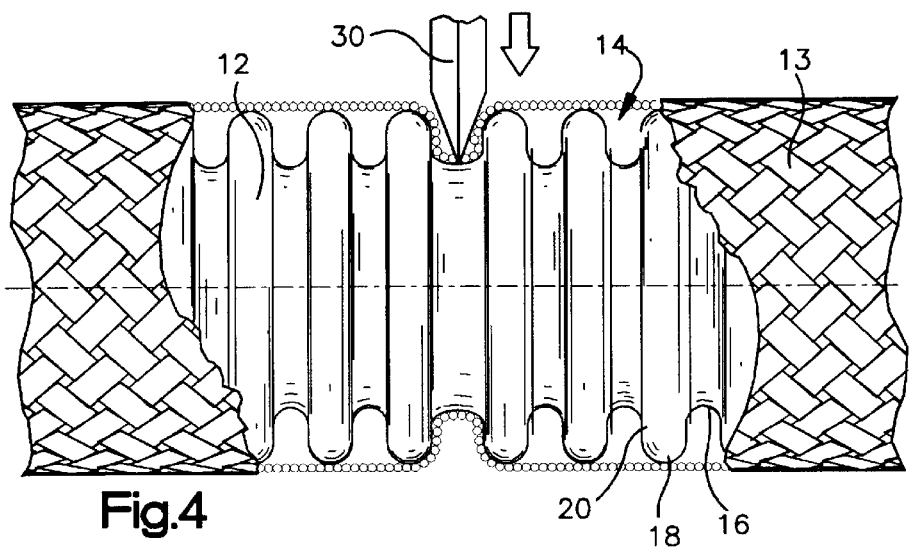
FIG. 4 is a view similar to FIG. 1 showing a schematic cutting tool engaging the shrouded tube at the corrugation valley location.

FIGS. 2–4 illustrate a method of terminating the shrouded tube 10 according to the invention that enables the tube 10 to be accurately cut off. Referring to FIG. 2, a forming tool 28 moves into engagement with shrouded tube 10 to deform the braiding and locate a corrugation valley 16. The illustrated forming tool 28 is shaped to deform, but not cut, the braided wire shroud 13 as it deforms the shroud. The tool is urged radially inwardly with respect to the annularly corrugated metal tube 12. If the forming tool 28 is not aligned with a corrugation valley 16, the forming tool 28 presses against a rounded corrugation surface, via the shroud 13, causing the annularly corrugated metal tube 12 and/or the shroud 13 to shift laterally with respect to the forming tool 28 and align the forming tool 28 with a corrugation valley 16. The forming tool 28 is thus guided into the valley as it yieldably deforms a portion of the braided wire shroud 13 into a tube corrugation valley 16. This effectively locates a corrugation valley 16 of the corrugated tube. The forming tool 28 yieldably deforms the braided shroud 13 into conformity with the tube corrugation valley 16 (See FIG. 3).

In the exemplary embodiment, the forming tool 28 and the shrouded tube 10 are relatively rotated as the forming tool deforms the braided shroud 13 so that the shroud D conforms to the corrugation valley completely around the tube circumference. The forming tool is schematically illustrated in FIGS. 1 and 2. It is contemplated that the tool 28 orbits about the tube 10 while deforming the shroud; but the tool may simply move radially toward the tube as the tube rotates about its longitudinal axis.

The illustrated tool 28 is shaped to conform to the corrugation valleys 16 and thus has a rounded profile that projects into the valley as the tool urges the shroud fully into a corrugation valley. The rounded profile (FIGS. 1 and 2) facilitates guiding the tool into the corrugation valleys as well as accommodating relative rotation between the tool and the tube 10.

Figure 5:
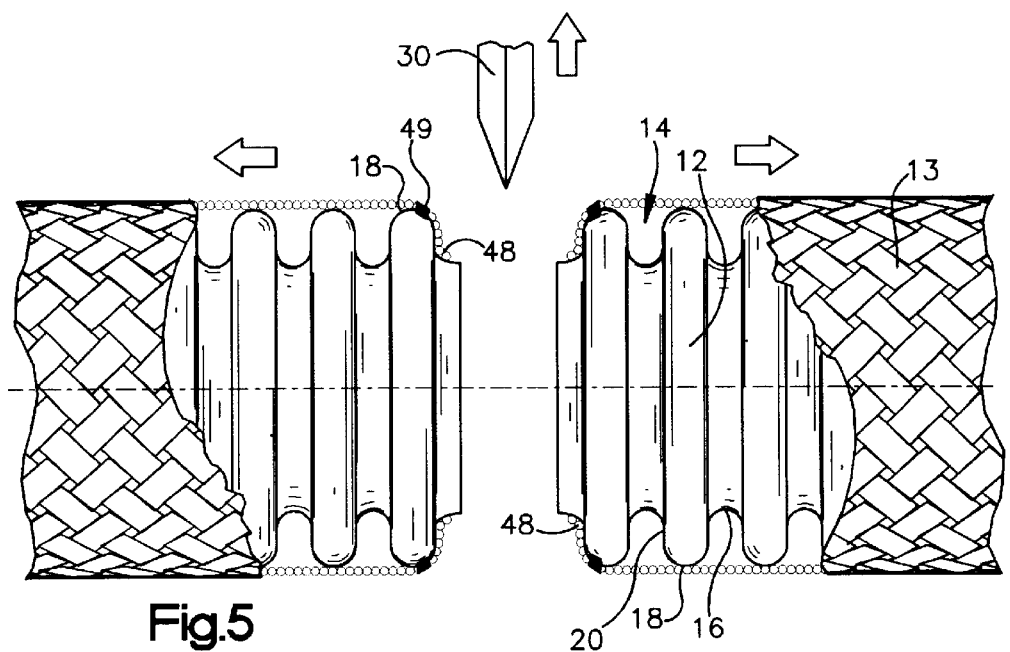
FIG. 5 is a view showing the severed ends of two shrouded tubes.

FIGS. 3, 4 and 5 illustrate a shrouded tube 10 being severed. In the illustrated embodiment of the invention the shrouded tube 10 is severed at the base of the tube corrugation valley 16 by a severing tool 30. The severing tool 30 is schematically illustrated, but may be a saw blade, the cutting wheel of a pipe cutter, or any other suitable tool. The illustrated severing tool 30 and the shrouded tube 10 are relatively rotated as the tube 10 is severed. For example, the tool 30 may orbit about the tube 10 while severing the shroud and tube 12. When the severing tool 30 is a saw blade, the severing tool 30 and the tube 12 do not have to be relatively rotated.

FIG. 6 and 6A illustrate a forming tool 28 mounted in a plier-like hand tool 40 that is constructed generally in accordance with U.S. Pat. No. 5,903,980 (the '980 patent), which is incorporated herein by reference. The '980 patent discloses (FIGS. 1–3) the hand tool 40 as used to cut off pipes and employs a sharp edged cutting wheel (reference character 24 in the '980 patent) that is resiliently urged against the pipe and orbited around the pipe for severing it. The sharp edged cutting wheel of the '980 patent disclosure is replaced by the forming tool 28 which, in the illustrations, is a disk that is rotatably supported on the hand tool 40 and has a smoothly rounded circular periphery, shaped to conform to the shape of a corrugation valley, that is resiliently urged into a corrugation valley while orbited around the shrouded tube 10.

In use, the hand tool 40 is mounted on the shrouded tube 10 and the forming tool 28 is moved into a valley 16 as the hand tool 40 is "snapped on" to the tube. The hand tool 40 is then manually orbited about the tube 10 so that the forming tool 28 deforms the shroud 13 into conformity with the valley continuously about the tube.

FIG. 7 illustrates a hand tool 42 that may be used to cut off the shrouded tube 10. The hand tool 42 is constructed as disclosed by U.S. Pat. No. 5,903,980 (see FIGS. 4 et seq.). The shrouded tube 10 is placed in the hand tool 42 with the deformed shroud and valley aligned axially with the severing tool 30. The severing tool 30 shown in FIG. 7 is in the form of a cutting wheel and is moved against the shrouded tube at the base of the valley. The hand tool 42 is orbited around the shrouded tube to cut the tube off at the base of the valley.

It should be noted that the hand tool 42 may also be modified so that the severing tool 30 is replaced by a forming tool 28. The hand tool 42, so modified, can be used to deform the shroud in the manner noted above.

It should be noted that the forming and severing tools 28, 30 may be associated with any conventional or suitable mechanisms that serve to urge the tools into engagement with the shrouded tube at the desired location and with sufficient force to perform their respective functions. Where the shrouded tube is not cut off at the base of the valley, the severing tool must be associated with a mechanism, such as a band saw, that can accurately cut the tube where desired away from the base of the valley.

After the shrouded tube 10 is severed, the shroud and corrugated tube are fixed together adjacent their severed ends to facilitate handling and ease the assembly of a hose end fitting onto the severed tube 10. Referring to FIG. 5, the severed end 48 of the braided wire shroud 13 is bonded to the corrugated tube near the shrouded tube end. In the exemplary embodiment, the shroud end 48 is bonded to the corrugated tube 12 by a weld 49 between the shroud end and a radially outer corrugation peak 18.

A preferred supplier of the shrouded tubes 10 is Hose Master, Inc. located in Cleveland, Ohio. The annularly corrugated metal tubes 12 of the exemplary embodiment are stainless steel, such as T-321 or T-316L stainless steel having inner diameters that range from 0.250 inches to 6 inches. In the exemplary embodiment, the braided wire shroud is single or double braided and is made from T-304 stainless steel.

Although a single embodiment of the invention has been illustrated and described herein in detail, the invention is not intended to be limited to the precise construction disclosed. Various modifications, adaptations, and uses of the invention may occur to those skilled in the business to which the invention relates. The intention is to cover all such modifications, adaptations and uses that fall within the spirit or scope of the appended claims.

Having described my invention I claim:

1. A method of making a wire braid shrouded annularly corrugated metal tube comprising:
   a. forming an annularly corrugated metal tube with the corrugations formed by radially inner corrugation valleys and radially outer peaks, adjacent peaks and valleys connected by generally radially extending tube wall sections;
   b. placing a braided wire shroud about the tube with the shroud extending along said radially outer corrugation peaks;

c. moving a forming tool into engagement with the shroud and into a tube corrugation valley to yieldably deform a portion of said braided shroud;

d. moving said deformed shroud portion substantially into the tube corrugation valley;

e. conforming the shroud portion to the corrugation peaks adjacent said tube corrugation valley; and f. severing said shroud and tube at a desired location between said corrugation peaks.

2. The method of claim 1 further comprising relatively rotating said forming tool and said braided shroud to yieldably deform a portion of said braided shroud into the tube corrugation valley around a circumference of said tube.

3. The method of claim 1 wherein said forming tool and said tube are relatively rotated as said forming tool is moved radially inward into engagement with said shroud to yieldably deform a portion of said braided shroud into the tube corrugation valley around a circumference of said tube.

4. The method of claim 1 further comprising bonding the corrugated tube to the shroud near a severed end of said shroud.

5. The method of claim 4 wherein the step of bonding comprises welding said shroud near a severed end of said shroud to a radially outer peak of said tube.

6. The method of claim 1 wherein a second tool is used to sever said shroud at a desired location between said corrugation peaks.

7. A method of making a wire braid shrouded annularly corrugated metal tube comprising:

a. forming an annularly corrugated metal tube with the corrugations formed by radially inner corrugation valleys and radially outer peaks, adjacent peaks and valleys connected by generally radially extending tube wall sections;

b. placing a braided wire shroud about the tube with the shroud extending along said radially outer corrugation peaks;

c. moving a blunt tool into engagement with the shroud;

d. urging said blunt tool radially inward with respect to said tube to deform a portion of said braided shroud into the tube corrugation valley to locate a valley of said corrugated tube; and e. severing said shroud and tube near a deformed area of said braided shroud in said valley.

8. The method of claim 7 further comprising relatively rotating said forming tool and said braided shroud to yieldably deform a portion of said braided shroud into the tube corrugation valley around a circumference of said tube.

9. The method of claim 7 wherein said forming tool and said tube are relatively rotated as said forming tool is urged radially inward into engagement with said shroud to yieldably deform a portion of said braided shroud into the tube corrugation valley around a circumference of said tube.

10. The method of claim 7 further comprising bonding the corrugated tube to the shroud near a severed end of said shroud.

11. The method of claim 7 wherein the step of bonding comprises welding said shroud near a severed end of said shroud to a radially outer peak of said tube.

12. The method of claim 7 wherein a second tool is used to sever said shroud at a desired location.

13. The method of claim 7 further comprising the step of moving a severed end of said shroud into second tube corrugation valley to expose a severed end of said tube.

* * * * *